United States Patent
Wang et al.

(10) Patent No.: US 10,019,005 B2
(45) Date of Patent: Jul. 10, 2018

(54) AUTONOMOUS VEHICLE CONTROL SYSTEM

(71) Applicants: Walter Wang, Hacienda Heights, CA (US); Jerome H. Wei, La Habra, CA (US); Bradley Feest, Los Alamitos, CA (US); Benjamin Najar-Robles, Arcadia, CA (US); Michael Z. Lim, Playa Del Rey, CA (US)

(72) Inventors: Walter Wang, Hacienda Heights, CA (US); Jerome H. Wei, La Habra, CA (US); Bradley Feest, Los Alamitos, CA (US); Benjamin Najar-Robles, Arcadia, CA (US); Michael Z. Lim, Playa Del Rey, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/266,708

(22) Filed: Sep. 15, 2016

(65) Prior Publication Data
US 2017/0097640 A1 Apr. 6, 2017

Related U.S. Application Data

(60) Provisional application No. 62/237,917, filed on Oct. 6, 2015.

(51) Int. Cl.
*G05D 1/00* (2006.01)
*G06N 7/00* (2006.01)

(52) U.S. Cl.
CPC ........... *G05D 1/0088* (2013.01); *G06N 7/005* (2013.01)

(58) Field of Classification Search
CPC .............................. G05D 1/0088; G06N 7/005
(Continued)

(56) References Cited

U.S. PATENT DOCUMENTS 3,486,937 A 12/1969 Linares
3,573,207 A 3/1971 Deschamps
(Continued)

FOREIGN PATENT DOCUMENTS

CA 2881744 A1 8/2015
CN 101800107 B 5/2012
(Continued)

OTHER PUBLICATIONS

Blidberg et al., Guidance and Control Architecture for the EAVE Vehicle, 1986-, IEEE, p. 449-461.*
(Continued)

*Primary Examiner* — McDieunel Marc
(74) *Attorney, Agent, or Firm* — Tarolli, Sundheim, Covell & Tummino LLP

(57) ABSTRACT

One example includes an autonomous vehicle control system. The system includes an operational plan controller to maintain operational plans that each correspond to a predetermined set of behavioral characteristics of an associated autonomous vehicle based on situational awareness data provided from on-board sensors of the autonomous vehicle and mission control data provided from a user interface. The system also includes a decision-making algorithm to select one of the operational plans for operational behavior of the autonomous vehicle based on the situational awareness data and the mission control data at a given time and to provide an intent decision based on the situational awareness data and the selected one of the operational plans. The system further includes an execution engine to provide control outputs to operational components of the autonomous
(Continued)

vehicle for navigation and control based on the selected one of the operational plans and in response to the intent decision.

20 Claims, 3 Drawing Sheets

(58) Field of Classification Search
USPC .......................................................... 701/27
See application file for complete search history.

(56) References Cited

U.S. PATENT DOCUMENTS

| | | | |
|---|---|---|---|
| 3,748,605 | A | 7/1973 | Baynham et al. |
| 4,186,357 | A | 1/1980 | Forterre et al. |
| 4,188,594 | A | 2/1980 | Bongianni |
| 4,189,521 | A | 2/1980 | Glass et al. |
| 4,459,567 | A | 7/1984 | Stern et al. |
| 4,689,585 | A | 8/1987 | Sequeira |
| 4,716,389 | A | 12/1987 | Gawronski et al. |
| 4,806,886 | A | 2/1989 | Stern et al. |
| 5,327,148 | A | 7/1994 | How et al. |
| 5,642,467 | A * | 6/1997 | Stover ................ G05B 13/0285 700/250 |
| 6,122,572 | A * | 9/2000 | Yavnai ................ G05D 1/0088 342/13 |
| 7,069,124 | B1 * | 6/2006 | Whittaker ............ G05D 1/0225 701/28 |
| 7,388,550 | B2 | 6/2008 | McLean |
| 7,482,977 | B2 | 1/2009 | Kuroda et al. |
| 7,844,396 | B2 * | 11/2010 | Zeitzew ............... G05D 1/0088 342/350 |
| 8,380,367 | B2 * | 2/2013 | Schultz ................ G01C 21/00 340/945 |
| 8,612,085 | B2 * | 12/2013 | Flohr ................... G05D 1/0011 701/27 |
| 8,878,741 | B2 | 11/2014 | Mosallaei |
| 9,527,394 | B1 * | 12/2016 | Tang ................... B60L 11/1818 |
| 2007/0112700 | A1 * | 5/2007 | Den Haan ............. G05D 1/024 706/14 |
| 2011/0015816 | A1 * | 1/2011 | Dow ..................... G01C 21/20 701/23 |
| 2013/0140076 | A1 | 6/2013 | Lee et al. |
| 2013/0342414 | A1 | 12/2013 | Hong et al. |
| 2014/0176380 | A1 | 6/2014 | Choi et al. |
| 2014/0195095 | A1 | 7/2014 | Flohr et al. |
| 2015/0051783 | A1 | 2/2015 | Tamir et al. |
| 2015/0234387 | A1 | 8/2015 | Mullan et al. |
| 2015/0255846 | A1 | 9/2015 | Sun et al. |
| 2016/0314224 | A1 * | 10/2016 | Wei ...................... G05B 17/02 |

FOREIGN PATENT DOCUMENTS

| | | |
|---|---|---|
| CN | 101807746 B | 6/2013 |
| CN | 103647511 A | 3/2014 |

OTHER PUBLICATIONS

Cuningham et al., MPDM: Multipolicy decision-making in dynamic, uncertain environments for autonomous driving, 2015, IEEE, p. 1670-1677.*

Dudziak et al., AI Programming Vs. Conventional Programming for Autonomous Vehicles Trade-Off Issue, 1985, IEEE, p. 284-296.*

Ferguson et al., A Reasoning Framework for Autonomous Urban Driving, 2008, IEEE, p. 775-780.*

International Search Report for corresponding PCT/US2016/051935, dated Nov. 30, 2016.

* cited by examiner

AUTONOMOUS VEHICLE CONTROL SYSTEM

RELATED APPLICATIONS

This application is claims priority of U.S. Provisional Patent Application Ser. No. 62/237917, filed 6 Oct. 2015, which is incorporated herein in its entirety.

This disclosure was made with Government support under United States Air Force Contract No. FA8650-11-C-3104. The Government has certain rights in this disclosure.

TECHNICAL FIELD

The present disclosure relates generally to artificial intelligence systems, and specifically to an autonomous vehicle control system.

BACKGROUND

Unmanned vehicles are becoming increasingly more common in a number of tactical missions, such as in surveillance and/or combat missions. As an example, in the case of aircraft, as some flight operations became increasingly more dangerous or tedious, unmanned aerial vehicles (UAV) have been developed as a means for replacing pilots in the aircraft for controlling the aircraft. Furthermore, as computer processing and sensor technology has advanced significantly, unmanned vehicles can be operated in an autonomous manner. For example, a given unmanned vehicle can be operated based on sensors configured to monitor external stimuli, and can be programmed to respond to the external stimuli and to execute mission objectives that are either programmed or provided as input commands, as opposed to being operated by a remote pilot.

SUMMARY

One example includes an autonomous vehicle control system. The system includes an operational plan controller to maintain operational plans that each correspond to a predetermined set of behavioral characteristics of an associated autonomous vehicle based on situational awareness data provided from on-board sensors of the autonomous vehicle and mission control data provided from a user interface. The system also includes a decision-making algorithm to select one of the operational plans for operational behavior of the autonomous vehicle based on the situational awareness data and the mission control data at a given time and to provide an intent decision based on the situational awareness data and the selected one of the operational plans. The system further includes an execution engine to provide control outputs to operational components of the autonomous vehicle for navigation and control based on the selected one of the operational plans and in response to the intent decision.

Another example includes a method for controlling an autonomous vehicle. The method includes providing mission control data to an autonomous vehicle control system associated with the autonomous vehicle via a user interface. The method also includes generating situational awareness data associated with the autonomous vehicle in response receiving sensor data provided from on-board sensors. The method also includes selecting one of a plurality of operational plans that each correspond to a predetermined set of behavioral characteristics of the autonomous vehicle based on the situational awareness data and the mission control data. The method further includes providing control outputs to operational components associated with the autonomous vehicle for navigation and control of the autonomous vehicle in response to the sensor data and based on the selected one of the plurality of operational plans.

Another example includes an autonomous vehicle. The vehicle includes on-board sensors configured to generate situational awareness data associated with situational awareness conditions of the autonomous vehicle. The vehicle also includes operational components configured to provide navigation and control of the autonomous vehicle in response to control outputs. The vehicle also includes an autonomous vehicle control system operating on a computer readable medium. The autonomous vehicle control system includes an operational plan controller configured to maintain a plurality of operational plans that each correspond to a predetermined set of behavioral characteristics of an associated autonomous vehicle based on the situational awareness data and mission control data. The system also includes a decision-making algorithm configured to select one of the plurality of operational plans for operational behavior of the autonomous vehicle based on the sensor data and the mission control data at a given time and to provide an intent decision based on the situational awareness data and based on the selected one of the plurality operational plans. The system further includes an execution engine configured to provide the control outputs to the operational components based on the selected one of the plurality of operational plans and in response to the intent decision.

DETAILED DESCRIPTION

The present disclosure relates generally to artificial intelligence systems, and specifically to an autonomous vehicle control system. An autonomous vehicle control system is implemented, for example, at least partially on a computer readable medium, such as a processor that is resident on an associated autonomous vehicle. For example, the autonomous vehicle can be configured as an unmanned aerial vehicle (UAV). The autonomous vehicle thus includes on-board sensors that are configured to generate sensor data that is associated with situational awareness of the autonomous vehicle, and further includes operational components that are associated with navigation and control of the autonomous vehicle (e.g., flaps, an engine, ordnance, or other operational components). The autonomous vehicle control system can thus provide autonomous control of the autonomous vehicle based on receiving the sensor data and mission control data (e.g., defining parameters of a given mission) and by providing output signals to the operational components.

The autonomous vehicle control system includes an operational plan controller, a decision-making algorithm, a utility calculation system, and an execution engine. The operational plan controller is configured to maintain predetermined operational plans that each correspond to a predetermined set of behavioral characteristics of the autonomous vehicle based on the sensor data and the mission control data, such as provided from a user interface. The utility calculation system is configured to calculate a total utility factor based on a plurality of behavioral characteristics. The decision-making algorithm is configured to select one of the plurality of operational plans for operational behavior of the autonomous vehicle based on the sensor data and the mission control data at a given time and to provide an intent decision based on situational awareness characteristics provided via the sensor data and the total utility factor for a given decision instance. The execution engine is configured to provide the outputs to the operational components for navigation and control of the autonomous vehicle based on the selected one of the operational plans and in response to the intent decision at the given decision instance.

Figure 1:
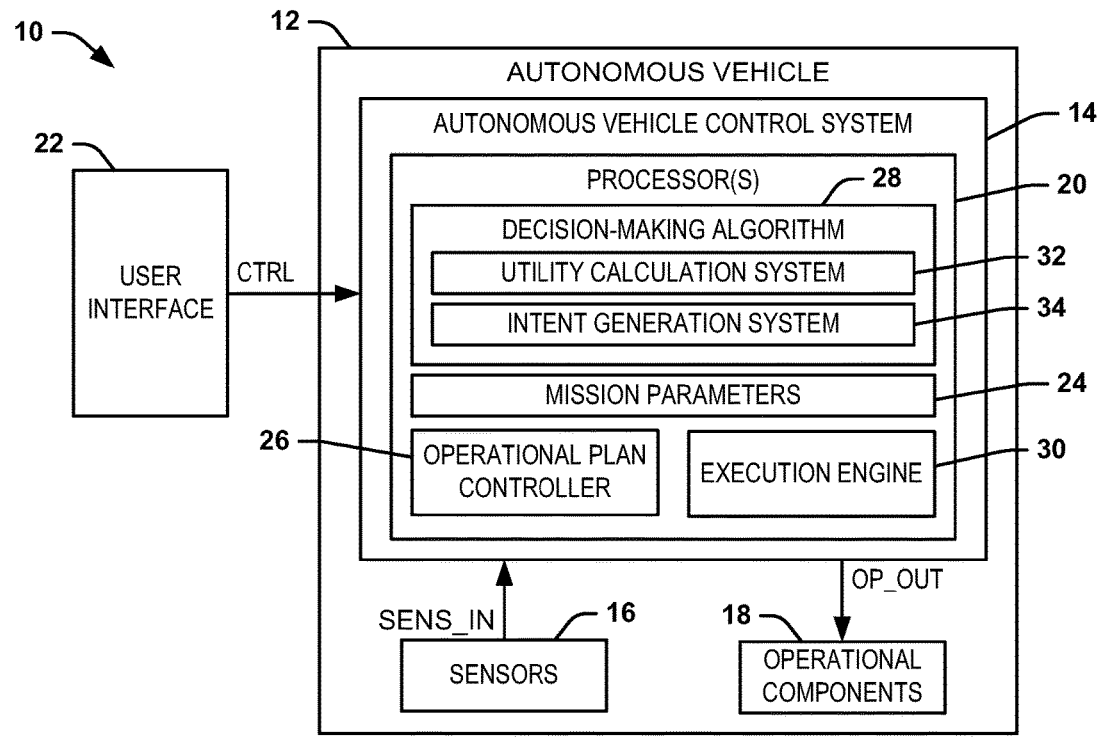
FIG. 1 illustrates an example of an autonomous vehicle system.

FIG. 1 illustrates an example of an autonomous vehicle system 10. The autonomous vehicle system 10 includes an autonomous vehicle 12. As described herein, the term "autonomous vehicle" describes an unmanned vehicle that operates in an autonomous manner, such that the autonomous vehicle 12 is not piloted or operated in any continuous manner, but instead operates continuously based on a programmed set of instructions that dictate motion, maneuverability, and the execution of actions directed toward completing mission objectives in response to sensor data associated with external stimuli. As an example, the autonomous vehicle 12 can be configured as an unmanned aerial vehicle (UAV) that operates in an autonomous programmable manner for any of a variety of different purposes. The autonomous vehicle 12 includes an autonomous vehicle control system 14 that can be programmed such that the autonomous vehicle 12 can operate autonomously to complete predetermined mission objectives in response to inputs, such as provided via sensor data and mission control data.

In the example of FIG. 1, the autonomous vehicle 12 includes a set of on-board sensors 16 that can provide sensor input data SENS_IN to the autonomous vehicle control system 14. As an example, the on-board sensors 16 can include optical sensors, one or more cameras, and/or other types of electro-optical imaging sensors (e.g., radar, lidar, or a combination thereof). The on-board sensors 16 can also include location and/or situational awareness sensors (e.g., a global navigation satellite system (GNSS) receiver). Therefore, the on-board sensors 16 can be configured to obtain situational awareness data that is provided as the sensor input data SENS_IN to the autonomous vehicle control system 14. Additionally, the autonomous vehicle 12 can include operational components 18 that can correspond to navigation and control devices for operating the autonomous vehicle 12 and for completing mission objectives. As an example, the operational components 18 can include navigation components (e.g., wing, body, and/or tail flaps), an engine, ordnance, and/or other operational components. The autonomous vehicle control system 14 can provide control outputs OP_OUT to the operational components 18 to control the operational components 18. Therefore, the autonomous vehicle 12 can operate based on providing the control outputs OP_OUT to the operational components 18 in response to receiving the sensor input data SENS_IN via the on-board sensors 16.

The autonomous vehicle control system 14 can be configured as one or more processors 20 that are programmed to generate the control outputs OP_OUT in response to the sensor input data SENS_IN to control the autonomous vehicle 12. The processor(s) 20 can thus execute programmable instructions, such as stored in memory (not shown). As an example, the processor(s) 20 constituting the autonomous vehicle control system 14 can be programmed via a user interface 22 that is associated with the autonomous vehicle system 10. For example, the user interface 22 can be configured as a computer system or graphical user interface (GUI) that is accessible via a computer (e.g., via a network). The user interface 22 can be configured, for example, to program the autonomous vehicle control system 14, to define and provide mission objectives, and/or to provide limited or temporary control of the autonomous vehicle 12, such as in response to an override request by the autonomous vehicle control system 14, as described in greater detail herein. In the example of FIG. 1, the user interface 22 is demonstrated as providing mission control data CTRL (e.g., wirelessly) that can correspond to predetermined mission parameters 24 that describe the mission definitions and objectives, such as including a predetermined navigation course, parameters for navigating the predetermined navigation course, at least one mission objective, and behaviors for accomplishing the mission objective(s). The mission control data CTRL can also provide program data for programming behavioral characteristics and/or vehicle piloting signals for providing user override control, such as described in greater detail herein. While the user interface 22 is described previously as a computer system or GUI, as another example, the user interface 22 can be configured as one or more chips or circuit boards (e.g., printed circuit boards (PCBs)) that can be installed in the autonomous vehicle control system 14, such that the user interface 22 can be pre-programmed with the mission control data CTRL and can be accessed by the autonomous vehicle control system 14.

In the example of FIG. 1, the processor(s) 20 can be programmed via the mission control data CTRL to implement an operational plan controller 26, a decision-making algorithm 28, and an execution engine 30. The operational plan controller 26 can control an operating plan associated with the autonomous vehicle 12, such as corresponding to a current behavioral mode in which the autonomous vehicle 12 operates. For example, the operational plan controller 26 can maintain a plurality of selectable operational plans that each correspond to a predetermined set of behavioral characteristics of the autonomous vehicle 12. As an example, the operational plan controller 26 can set the autonomous vehicle control system 14 to operate in a given operational plan at a given duration of time based on the sensor input data SENS_IN and/or the mission control data CTRL provided from the user interface 22. As described in greater detail herein, the operational plan controller 26 can be configured to set a given operational plan based on the decision-making algorithm 28 in response to a given intent decision, such as at a given decision instance.

As described herein, the term "intent decision" refers to a decision that is required to be made by the decision-making algorithm 28 that is consistent with predetermined parameters associated with control of the autonomous vehicle 12 and programmable behavioral characteristics of the autonomous vehicle control system 14 to control the autonomous vehicle 12 in response to unexpected circumstances. As also described herein, the term "decision instance" refers to a given time and/or set of circumstances that are dependent on unexpected and/or unplanned external stimuli (e.g., provided via the sensor input data SENS_IN) that require a decision via the decision-making algorithm 28 to dictate behavior of the autonomous vehicle 12.

Figure 2:
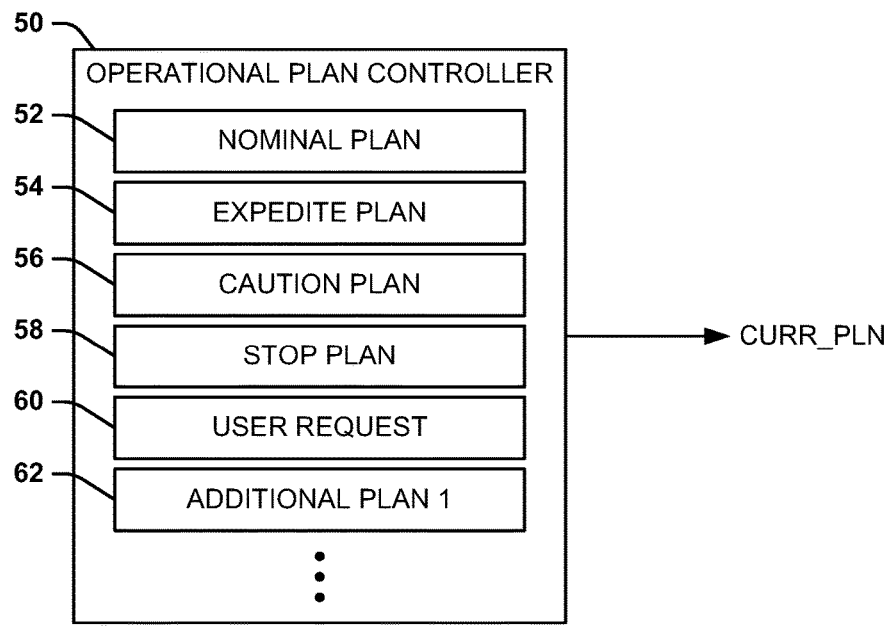
FIG. 2 illustrates an example of an operational plan controller.

FIG. 2 illustrates an example of an operational plan controller 50. As an example, the operational plan controller 50 can be implemented as hardware, software, firmware, or a combination thereof that is executable by the processor(s) 20. The operational plan controller 50 can correspond to the operational plan controller 26 in the example of FIG. 1. Therefore, reference is to be made to the example of FIG. 1 in the following description of the example of FIG. 2.

The operational plan controller 50 can select an operating plan associated with the autonomous vehicle 12, such as corresponding to a current behavioral mode in which the autonomous vehicle 12 operates. In the example of FIG. 2, the selected operating plan is provided as a command CURR_PLN, which can be configured to trigger one or more routines corresponding to the selected operating plan (e.g., in the autonomous vehicle controller 14 or in the operational plan controller 50 itself). The operational plan controller 50 includes a nominal plan 52, an expedite plan 54, a caution plan 56, a stop plan 58, and a user request plan 60. The nominal plan 52 can be associated with a nominal operational behavior of the autonomous vehicle 12 and can be based on the mission control data CTRL. As an example, the nominal plan 52 can be a default operational plan that the operational plan controller 50 sets as the operational plan for the autonomous vehicle control system 14 when all other systems are stable, such as during initialization (e.g., take-off), completion (e.g., landing), and/or during the mission defined by the mission parameters 24, such as absent perturbations by unexpected and/or unplanned external factors. As an example, the mission control data CTRL can dictate the external conditions as to when the autonomous vehicle control system 14 should be set to the nominal plan 52.

The expedite plan 54 can be associated with an expedited operational behavior of the autonomous vehicle 12 relative to the nominal operational behavior of the nominal plan 52 and can be based on the mission control data CTRL. As an example, the mission control data CTRL can dictate when the autonomous vehicle control system 14 should switch from the nominal plan 52 to the expedite plan 54 based on external conditions or based on the mission parameters 24. For example, delays in the mission defined by the mission parameters 24 based on previous circumstances (e.g., operating in the caution plan 56, as described in greater detail herein) can result in the autonomous vehicle 12 operating behind schedule for one or more specific mission criteria defined by the mission parameters 24. Therefore, the expedite plan 54 can be implemented by the operational plan controller 50 for the autonomous vehicle control system 14 when all other systems are stable during the mission defined by the mission parameters 24 absent perturbations by unexpected and/or unplanned external factors to attempt to recapture time. As described herein, the expedite plan 54 can be implemented in situations when the decision-making algorithm 28 calculates that the utility of an expedited mission operation outweighs the utility of increased risk to the autonomous vehicle 12 or to completion of the mission objective(s).

The caution plan 56 can be associated with a reduced-risk operational behavior of the autonomous vehicle 12 relative to the nominal operational behavior of the nominal plan 52 and can be based on the mission control data CTRL. As an example, the mission control data CTRL can dictate when the autonomous vehicle control system 14 should switch from the nominal plan 52 to the caution plan 56 based on external conditions, such as perceived hazards and/or threats based on the sensor input data SENS_IN. For example, upon a determination of hazardous environment conditions, an external obstacle, or an imminent or detected threat that may require evasive maneuvering, the operational plan controller 50 can set or can be instructed to set the autonomous vehicle control system 14 to the caution plan 56. Therefore, the autonomous vehicle control system 14 can dictate a slower speed for the autonomous vehicle 12, such as to provide capability for reducing risks by providing more time for reaction and/or maneuvering. Alternatively, the caution plan 56 may force deviation from the predetermined navigation course associated with completion of the mission objectives, as defined by the mission parameters 24, while still maintaining a rapid speed for the autonomous vehicle 12. For example, the autonomous vehicle control system 14 can decide that operation of the autonomous vehicle 12 in a predetermined navigation course defined by the mission parameters 24 in the nominal plan 52 is too risky, such as described in greater detail herein, and can thus command the operational plan controller 50 to switch to the caution plan 56 as the current operational plan CURR_PLN.

Similarly, the stop plan 58 can be associated with ceased operational behavior of the autonomous vehicle 12, such as in response to detecting an imminent collision with an obstacle or another moving vehicle. As an example, the stop plan 58 can be associated with an autonomous land vehicle, or an autonomous aerial vehicle that is preparing to take off or has landed. Lastly, the user request plan 60 can correspond to a situation in which the autonomous vehicle control system 14 transmits a request for instructions from the user interface 22. For example, in response to the decision-making algorithm 28 determining an approximately equal utility or probability in determining a given intent decision at a respective decision instance, the autonomous vehicle control system 14 can be switched to the user request plan 60. As an example, the user request plan 60 can accompany another operational plan of the operational plan controller 50, such as one of the nominal plan 52, the caution plan 56, or the stop plan 58, such that the autonomous vehicle 12 can continue to operate in a predetermined manner according to the selected operational plan CURR_PLN while awaiting additional instructions as dictated by the user request plan 60. Furthermore, the operational plan controller 50 can also include at least one additional plan 62 that can dictate a respective at least one additional behavioral mode in which the autonomous vehicle 12 can operate. Thus, the operational plan controller 50 is not limited to providing the current plan CURR_PLN as one of the nominal plan 52, the expedite plan 54, the caution plan 56, the stop plan 58, and the user request 60.

Referring back to the example of FIG. 1, the decision-making algorithm 28 includes a utility calculation system 32 and an intent generation system 34. The utility calculation system is configured to calculate a total utility factor (TUF) for each of the operational plans (e.g., the nominal plan 52, the expedite plan 54, the caution plan 56, the stop plan 58, the user request plan 60, and/or the additional plan(s) 62) that are maintained by the operational plan controller 26. The calculation of the TUF can be based on behavioral characteristics that can correspond to characteristics of the autonomous vehicle 12, user inputs provided via the user interface 22, avoidance of potential obstacles (e.g., external objects, such as other aircraft, terrain features, buildings, etc.), integrity of the sensors 16, and/or predetermined performance characteristics of the operational components 18 of the autonomous vehicle 12. Thus, the utility calculation system 32 can be configured to command the operational plan controller 26 to select the operational plan based on the TUF calculated for each of the operational plans (e.g., based on the highest TUF).

Figure 3:
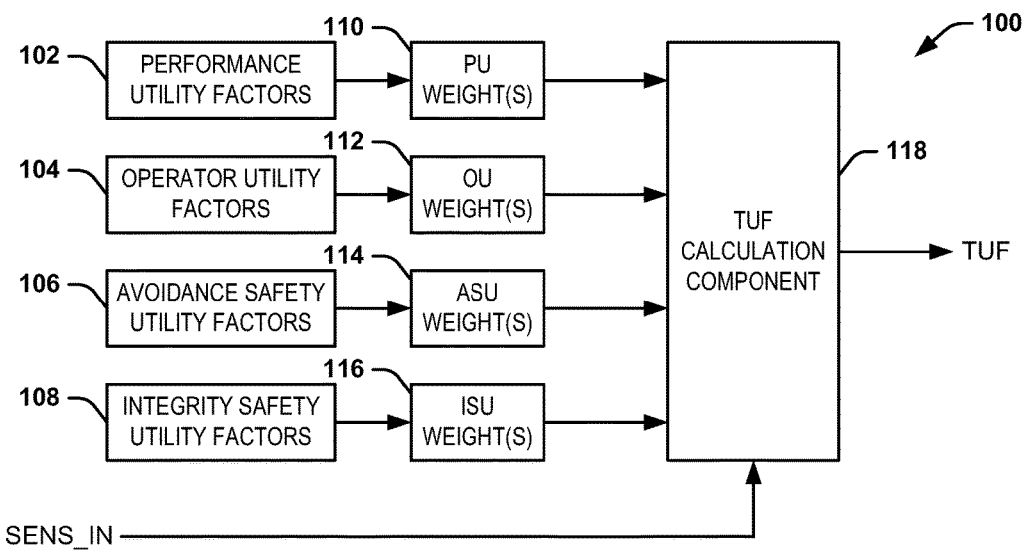
FIG. 3 illustrates an example of a utility calculation system for a decision-making algorithm.

FIG. 3 illustrates an example of a utility calculation system 100 for a decision-making algorithm (e.g., the decision-making algorithm 28). As an example, the utility calculation system 100 can be implemented as hardware, software, firmware, or a combination thereof that is executable by the processor(s) 20. The utility calculation system 100 can correspond to the utility calculation system 32 in the example of FIG. 1. Therefore, reference is to be made to the example of FIG. 1 in the following description of the example of FIG. 3.

The utility calculation system 100 can implement a variety of predetermined behavioral factors to calculate the TUF that can dictate the operational behavior of the autonomous vehicle control system 14. In the example of FIG. 3, the behavioral factors include performance utility factors 102 associated with performance characteristics of the autonomous vehicle 12 and/or characteristics of the mission defined by the mission parameters 24. As an example, the performance utility factors 102 can include timing associated with the mission, such as defined by the mission parameters 24, can include capabilities of the autonomous vehicle 12, such as velocity, handling, maneuverability, response speed, turning radii, and/or other navigation characteristics (e.g., including motion in six-degrees of freedom), changes toperformance based on ordnance loading, and/or a variety of other performance characteristics of the autonomous vehicle 12. The behavioral factors also include operator utility factors 104 associated with the mission control data CTRL and availability of operator inputs for control of the autonomous vehicle 12. As an example, the operator utility factors 104 can include timing associated with response time for communications with a user via the user interface 22, such as relating to a current velocity of the autonomous vehicle 12, as well as a level of detail required to provide user input (e.g., in response to requests that can be provided in the user request plan 60).

The behavioral factors can also include avoidance safety utility factors 106 associated with consequences of collision of the autonomous vehicle 12. The avoidance safety utility factors 106 can account for velocity of the autonomous vehicle 12 relative to a type of potential obstacle with which the autonomous vehicle 12 can have an imminent collision, such as based on an evaluation of static objects (e.g., terrain) relative to dynamic objects (e.g., other vehicles, threats, etc.). The behavioral factors can further include integrity safety utility factors 108 that are associated with an impact of environmental conditions on the on-board sensors 16 and operational components 18 associated with the autonomous vehicle 12. For example, the integrity safety utility factors 108 can be associated with the effects of weather on the on-board sensors 16 and operational components 18, such as the effects of rain occluding optical components of the on-board sensors 16, the effects of rain on the grip of tires to a concrete airport tarmac, the effect of turbulence on the operational components 18, the effect of clouds on the sensors 16, etc.

In the example of FIG. 3, the utility calculation system 100 also includes respective programmable weights that are selectively assigned to the plurality of behavioral characteristics. As an example, each of the programmable weights can be provided as a portion of the mission control data CTRL provided via the user interface 22. The programmable weights include performance utility weight(s) 110 ("PU WEIGHT(S)") that can be associated with the performance utility factors 102, operator utility weight(s) 112 ("OU WEIGHT(S)") that can be associated with the operator utility factors 104, avoidance safety utility weight(s) 114 ("ASU WEIGHT(S)") that can be associated with the avoidance safety utility factors 106, and integrity safety utility weight(s) 116 ("ISU WEIGHT(S)") that can be associated with the integrity safety utility factors 108. Each of the performance utility weight(s) 110, operator utility weight(s) 112, avoidance safety utility weight(s) 114, and integrity safety utility weight(s) 116 can include one or more weighted multiplicative factors that can emphasize or de-emphasize certain ones of the behavioral factors (e.g., in each of the performance utility factors 102, operator utility factors 104, avoidance safety utility factors 106, and integrity safety utility factors 108) at a given time. The selection of the performance utility weight(s) 110, operator utility weight(s) 112, avoidance safety utility weight(s) 114, and/or integrity safety utility weight(s) 116 can be based, for example, on the mission control data CTRL at various stages of a given mission defined by the mission parameters 24. Therefore, a user can implement the user interface 22 to selectively and programmably set the weights of the respective performance utility weight(s) 110, operator utility weight(s) 112, avoidance safety utility weight(s) 114, and integrity safety utility weight(s) 116 at various stages of the mission defined by the mission parameters 24 to dictate the operational plan of the autonomous vehicle control system 14 for operating the autonomous vehicle 12.

In the example of FIG. 3, the weighted performance utility factors 102, demonstrated as WPU, the weighted operator utility factors 104, demonstrated as WOU, the weighted avoidance safety utility factors 106, demonstrated as WASU, and the weighted integrity safety utility factors 108, demonstrated as WISU, are provided to a TUF calculation component 118. The TUF calculation component 118 is configured to calculate the TUF for each given one of the operational plans (e.g., the nominal plan 52, the expedite plan 54, the caution plan 56, the stop plan 58, and/or the user request plan 60). In addition, the TUF calculation component 118 can receive situational awareness data via the sensor input data SENS_IN, such that the TUF can be modified based on external considerations (e.g., weather, threats, potential obstacles, etc.). Therefore, the TUF calculation component 118 can calculate the TUF for each of the operational plans, and can provide the calculated TUF for each of the operational plans to the operational plan controller 26 for selection of a given one of the operational plans at a given time.

Figure 4:
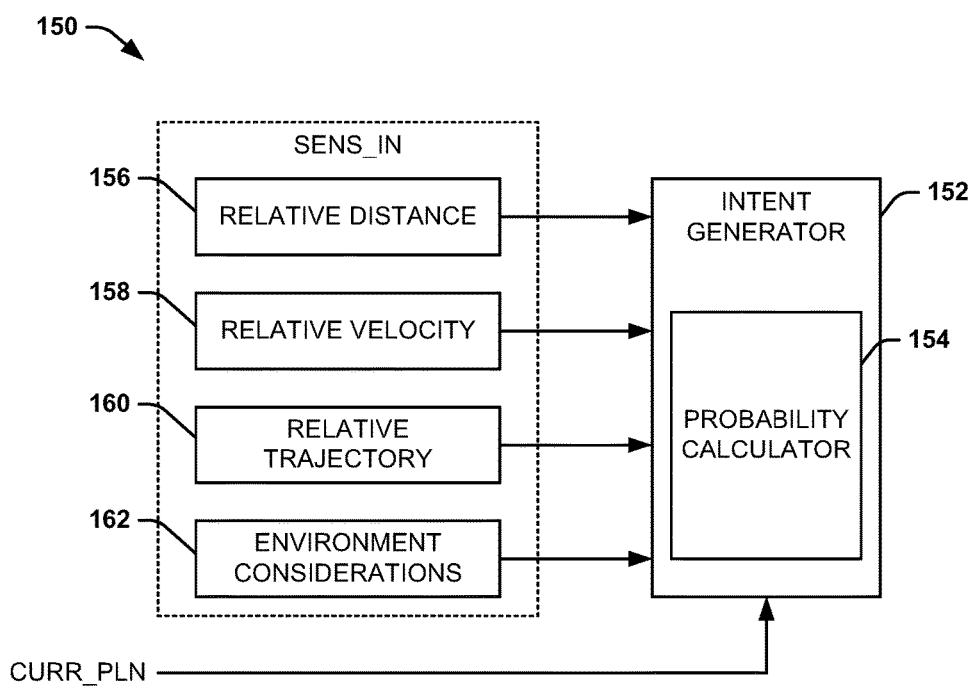
FIG. 4 illustrates an example of an intent generation system.

FIG. 4 illustrates an example of an intent generation system 150. As an example, the intent generation system 150 can be implemented as hardware, software, firmware, or a combination thereof that is executable by the processor(s) 20. The intent generation system 150 is demonstrated in the example of FIG. 4 as a motion intent generation system to provide decision-making capability in the context of motion of the autonomous vehicle 12, such as for the autonomous vehicle 12 moving on an airfield tarmac. For example, the intent generation system 150 is demonstrated as a collision avoidance intent generator to provide an intent decision for operation of the autonomous vehicle 12 to avoid a collision of the autonomous vehicle 12 with a potential obstacle (e.g., another aircraft on the tarmac). The intent generation system 150 can correspond to the intent generation system 34 in the example of FIG. 1. Therefore, reference is to be made to the example of FIG. 1 in the following description of the example of FIG. 4.

The intent generation system 150 includes an intent generator 152 that is configured to provide the intent decision for a given decision instance. The intent generator 152 is demonstrated as including a probability calculator 154 that is configured to calculate a set of probabilities associated with predetermined possible outcomes for a given decision instance. For example, the set of probabilities can include a probability of collision with another aircraft that approaches the same intersection of the tarmac as the autonomous vehicle 12. Thus, the possible courses of action for the autonomous vehicle 12 could include: proceed at the same speed, slow down, speed up, stop, turn left, turn right, go straight, etc. Therefore, the intent generator 152 is configured to provide an intent decision based on the set of probabilities, such as to provide the intent decision based on a most acceptable relative probability of the set of probabilities. In the example of FIG. 4 the probability calculator 154 calculates the set of probabilities based on the situational awareness characteristics provided via the sensor input data SENS_IN and the selected operational plan, demonstrated in the example of FIG. 4 as "CURR_PLN". The probabilities can be calculated by the probability calculator 154 based on any of a variety of algorithms, such as a Bayesian network, influence diagrams, and/or a variety of other decision theory calculations.

The situational awareness characteristics can be provided via the sensor input data SENS_IN are demonstrated as including a relative distance 156, a relative velocity 158, a relative trajectory 160, and environmental considerations 162. The relative distance 156, the relative velocity 158, and the relative trajectory 160 can correspond to respective motion features of autonomous vehicle 12 relative to one or more potential obstacles, such as another aircraft on the tarmac (e.g., at an intersection of the tarmac). The relative distance 156 can thus correspond to a relative distance between the autonomous vehicle 12 and the potential obstacle, such as with respect to the intersection or with respect to each other. The relative velocity 158 can thus correspond to a relative velocity between the autonomous vehicle 12 and the potential obstacle with respect to each other or with respect to the intersection. The relative trajectory 160 can thus correspond to a relative direction of motion between the autonomous vehicle 12 and the potential obstacle, such as could indicate intersection of motion and thus a potential collision. The environmental considerations 162 can include characteristics of the environment in which the autonomous vehicle 12 operates. For example, rain, snow, or ice on the tarmac could affect the performance of the autonomous vehicle 12 on the tarmac, and thus the probability of collision of the autonomous vehicle 12 and the potential obstacle could increase at a given relative distance 156, relative velocity 158, and/or relative trajectory 160.

As described previously, upon calculating the set of probabilities of the possible outcomes of the decision instance via the probability calculator 154, the intent generator 152 can provide the intent decision corresponding to a most favorable probable outcome for a given course of action. Referring back to the example of FIG. 1, the decision-making algorithm 28 can communicate the intent decision to the execution engine 30. The execution engine 30 can be configured to execute the physical results of the intent decision by generating an appropriate set of outputs that can collectively correspond to the control outputs OP_OUT. Thus, the control outputs OP_OUT can be provided to the operational components 18 of the autonomous vehicle 12 for execution of the intent decision. For example, the probability calculator 154 could calculate the probability of collision with the other aircraft approaching the tarmac, as described previously, for each of the courses of action (e.g., proceed at the same speed, slow down, speed up, stop, turn left, turn right, go straight, etc.). Thus, as an example, the intent generator 152 could determine that the most favorable course of action based on the calculated probabilities is for the autonomous vehicle 12 to turn left at the tarmac intersection. Therefore, the intent generator 152 can provide the corresponding intent decision to the execution engine 30 to generate the corresponding control outputs OP_OUT to turn the wheel(s) of the autonomous vehicle 12 (with the wheel(s) corresponding to the appropriate operational components 18) to enact a left turn of the autonomous vehicle 12 at the appropriate time (e.g., as provided by the sensor input data SENS_IN). Accordingly, the autonomous vehicle 12 can operate in a manner that substantially reduces the probability of collision with the potential obstacle based on the determined intent decision.

The description herein of the intent generation system 150 providing intent decision making for the autonomous vehicle 12 is provided by example. Therefore, the intent generation system 150 can be configured to generate intent decisions for any of variety of other situations and scenarios that require intent decisions based on external stimuli and/or situational awareness. For example, the intent generation system 150 can be implemented to provide intent decisions during the mission defined by the mission parameters 24, such as to decide to deviate from a predetermined navigation course in response to unexpected circumstances (e.g., threats, weather conditions, etc.). Additionally, the intent generation system 150 can provide navigation intent decisions in response to deviation from the predetermined navigation course, such as to avoid obstacles, threats, mid-air collisions, to attempt returning to the predetermined course, to attempt an alternative course to completion of the mission, and/or to decide to abort the mission. Accordingly, the intent generation system 150 can be implemented by the decision-making algorithm 28 in a variety of ways to provide autonomous control of the autonomous vehicle 12.

Figure 5:
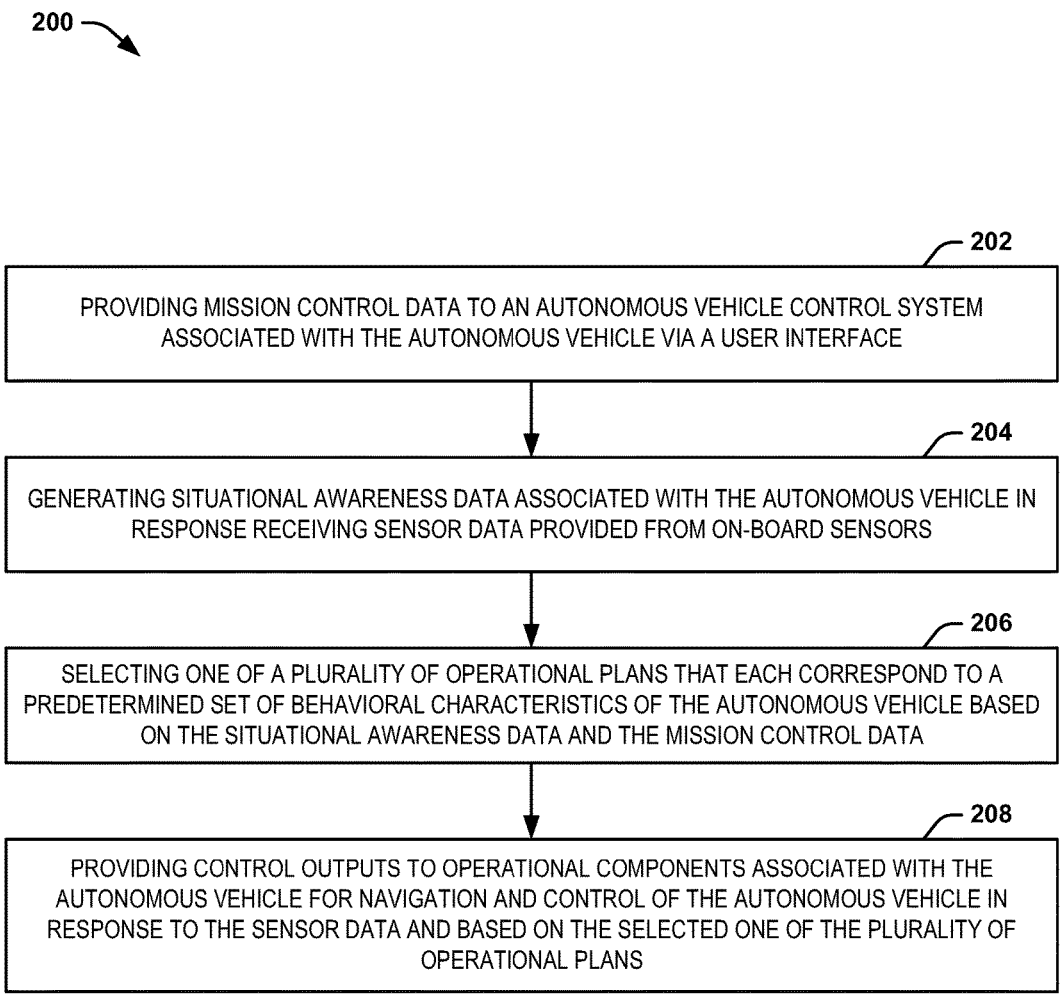
FIG. 5 illustrates an example of a method for controlling an autonomous vehicle.

In view of the foregoing structural and functional features described above, a method in accordance with various aspects of the present disclosure will be better appreciated with reference to FIG. 5. While, for purposes of simplicity of explanation, the method of FIG. 5 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 5 illustrates a method 200 for controlling an autonomous vehicle (e.g., the autonomous vehicle 12). At 202, mission control data (e.g., the mission control data CTRL) is provided to an autonomous vehicle control system (e.g., the autonomous vehicle control system 14) associated with the autonomous vehicle via a user interface (e.g., the user interface 22). At 204, situational awareness data associated with the autonomous vehicle is generated in response receiving sensor data (e.g., the sensor data SENS_IN) provided from on-board sensors (e.g., the on-board sensors 16). At 206, one of a plurality of operational plans (e.g., the operational plans 52, 54, 56, 58, 60, 62) that each correspond to a predetermined set of behavioral characteristics of the autonomous vehicle is selected based on the situational awareness data and the mission control data. At 208, control outputs (e.g., the control outputs OP_OUT) are provided to operational components (e.g., the operational components 18) associated with the autonomous vehicle for navigation and control of the autonomous vehicle in response to the sensor data and based on the selected one of the plurality of operational plans.

What have been described above are examples of the disclosure. It is, of course, not possible to describe every conceivable combination of components or methodologies for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. An autonomous vehicle control system operating on a computer readable medium, the autonomous vehicle control system comprising:
    an operational plan controller configured to maintain a plurality of operational plans that each correspond to a predetermined set of behavioral characteristics of an associated autonomous vehicle based on situational awareness data provided via on-board sensors of the autonomous vehicle and mission control data provided from a user interface;
    a decision-making algorithm configured to select one of the plurality of operational plans for operational behavior of the autonomous vehicle based on the situational awareness data and the mission control data at a given time and to provide an intent decision based on the situational awareness data and the selected one of the plurality operational plans; and
    an execution engine configured to provide control outputs to operational components associated with the autonomous vehicle for navigation and control of the autonomous vehicle based on the selected one of the plurality of operational plans and in response to the intent decision.

2. The system of claim 1, wherein the decision-making algorithm comprises a utility calculation system configured to calculate a total utility factor for each of the plurality of operational plans based on a plurality of behavioral characteristics, the utility calculation system being configured to select the one of the plurality of operational plans based on the total utility factor calculated for each of the plurality of operational plans.

3. The system of claim 2, wherein the decision-making algorithm further comprises an intent generation system configured to provide the intent decision, wherein the intent generation system comprises a probability calculator configured to calculate a set of probabilities associated with predetermined possible outcomes for the given decision instance based on the situational awareness data and the selected one of the plurality operational plans.

4. The system of claim 2, wherein the plurality of behavioral characteristics comprises at least one of:
    performance utility factors associated with performance characteristics of the autonomous vehicle;
    operator utility factors associated with the mission control data and availability of operator inputs for control of the autonomous vehicle;
    avoidance safety utility factors associated with consequences of collision of the autonomous vehicle; and
    integrity safety utility factors associated with an impact of environmental conditions on the on-board sensors and operational components associated with the autonomous vehicle.

5. The system of claim 2, wherein the total utility factor is calculated based on the plurality of behavioral characteristics and based on a respective plurality of programmable weights that are selectively assigned to the plurality of behavioral characteristics and are provided as a portion of the mission control data provided via the user interface.

6. The system of claim 2, wherein the mission control data comprises mission parameters that describe mission definitions and objectives, wherein the utility calculation system is configured to select the one of the plurality of operational plans based on the mission parameters and based on the total utility factor calculated for each of the plurality of operational plans.

7. The system of claim 1, wherein the plurality of operational plans comprises at least one of:
    a nominal plan associated with a nominal operational behavior of the autonomous vehicle and the mission control data;
    an expedite plan associated with an expedited operational behavior of the autonomous vehicle relative to the nominal operational behavior and based on the mission control data;
    a caution plan associated with a reduced-risk operational behavior of the autonomous vehicle relative to the nominal operational behavior and based on the mission control data;
    a stop plan associated with ceased operational behavior of the autonomous vehicle; and
    a user request plan in which the autonomous vehicle transmits a request for instructions from the user interface.

8. The system of claim 1, wherein the decision-making algorithm comprises a collision-avoidance algorithm configured to provide the intent decision to avoid a collision of the autonomous vehicle with a potential obstacle.

9. The system of claim 8, wherein the collision-avoidance algorithm is configured to provide the intent decision to avoid the collision of the autonomous vehicle with the potential obstacle based on at least one of:
    a relative distance of the autonomous vehicle and the potential obstacle;
    a relative velocity of the autonomous vehicle and the potential obstacle;
    a relative trajectory of the autonomous vehicle and the potential obstacle; and
    environment conditions associated with an environment of the autonomous vehicle.

10. An autonomous vehicle comprising the autonomous vehicle control system of claim 1, wherein the autonomous vehicle further comprises:
    the on-board sensors configured to generate the sensor data; and
    the operational components configured to provide navigation and control of the autonomous vehicle.

11. A method for controlling an autonomous vehicle, the method comprising:
    providing mission control data to an autonomous vehicle control system associated with the autonomous vehicle via a user interface;
    generating situational awareness data associated with the autonomous vehicle in response receiving sensor data provided from on-board sensors;

selecting one of a plurality of operational plans that each correspond to a predetermined set of behavioral characteristics of the autonomous vehicle based on the situational awareness data and the mission control data; and providing control outputs to operational components associated with the autonomous vehicle for navigation and control of the autonomous vehicle in response to the sensor data and based on the selected one of the plurality of operational plans.

12. The method of claim 11, further comprising calculating a total utility factor for each of the plurality of operational plans based on a plurality of behavioral characteristics, wherein selecting the one of the plurality of operational plans comprises selecting the one of the plurality of operational plans based on the total utility factor calculated for each of the plurality of operational plans.

13. The method of claim 12, wherein calculating the total utility factor comprises providing a respective plurality of programmable weights that are selectively assigned to the plurality of behavioral characteristics via the mission control data.

14. The method of claim 11, wherein providing the mission control data comprises providing mission parameters that describe mission definitions and objectives, wherein selecting the one of the plurality of operational plans comprises selecting the one of the plurality of operational plans based on the mission parameters and based on the total utility factor calculated for each of the plurality of operational plans.

15. The method of claim 11, further comprising providing an intent decision at a given decision instance based on the sensor data and based on the selected one of the plurality operational plans, wherein providing the control outputs further comprises providing the control outputs to the operational components associated with the autonomous vehicle in response to the intent decision and based on the selected one of the plurality of operational plans.

16. The method of claim 15, further comprising calculating a set of probabilities associated with predetermined possible outcomes for the given decision instance based on the situational awareness data and the selected one of the plurality operational plans, wherein providing the intent decision comprises providing the intent decision based on a most acceptable relative probability of the set of probabilities.

17. The method of claim 15, wherein generating the situational awareness data comprises:
obtaining a relative distance between the autonomous vehicle and a potential obstacle;
obtaining a relative velocity between the autonomous vehicle and the potential obstacle;
obtaining a relative trajectory between the autonomous vehicle and the potential obstacle; and
obtaining environmental considerations associated with an environment of the autonomous vehicle;

wherein calculating the set of probabilities comprises calculating the set of probabilities associated with predetermined possible outcomes for the given decision instance based on the relative distance, the relative velocity, the relative trajectory, and the environmental conditions, and based on the selected one of the plurality operational plans.

18. An autonomous vehicle comprising:
on-board sensors configured to generate situational awareness data associated with situational awareness conditions of the autonomous vehicle;
operational components configured to provide navigation and control of the autonomous vehicle in response to control outputs; and
an autonomous vehicle control system operating on a computer readable medium, the autonomous vehicle control system comprising:
an operational plan controller configured to maintain a plurality of operational plans that each correspond to a predetermined set of behavioral characteristics of an associated autonomous vehicle based on the situational awareness data and mission control data;
a decision-making algorithm configured to select one of the plurality of operational plans for operational behavior of the autonomous vehicle based on the sensor data and the mission control data at a given time and to provide an intent decision based on the situational awareness data and based on the selected one of the plurality operational plans; and
an execution engine configured to provide the control outputs to the operational components based on the selected one of the plurality of operational plans and in response to the intent decision.

19. The system of claim 18, wherein the decision-making algorithm comprises:
a utility calculation system configured to calculate a total utility factor for each of the plurality of operational plans based on a plurality of behavioral characteristics, the utility calculation system being configured to select the one of the plurality of operational plans based on the total utility factor calculated for each of the plurality of operational plans; and
an intent generation system configured to provide the intent decision, wherein the intent generation system comprises a probability calculator configured to calculate a set of probabilities associated with predetermined possible outcomes for the given decision instance based on the situational awareness characteristics and the selected one of the plurality operational plans.

20. The system of claim 19, wherein the total utility factor is calculated based on the plurality of behavioral characteristics and based on a respective plurality of programmable weights that are selectively assigned to the plurality of behavioral characteristics and are provided as a portion of the mission control data provided via the user interface.

* * * * *